A. BURTON.
SWATH ROD ATTACHMENT FOR MOWING MACHINES.
APPLICATION FILED FEB. 21, 1910.
980,195.
Patented Jan. 3, 1911.
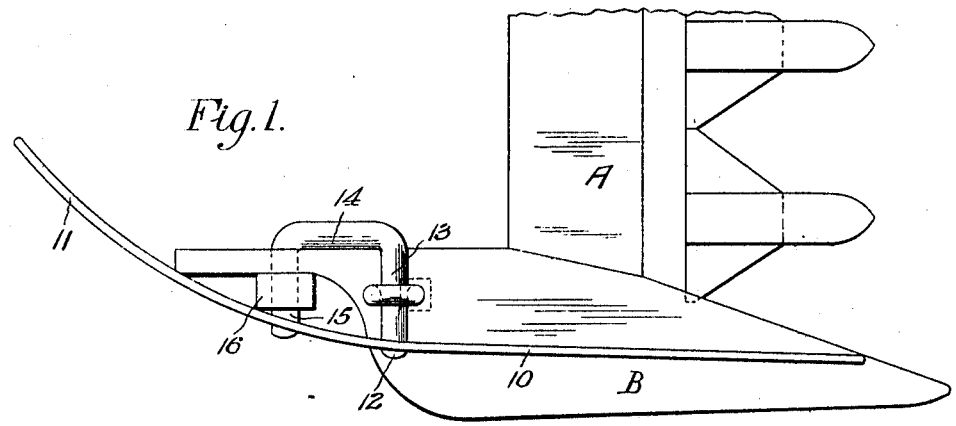
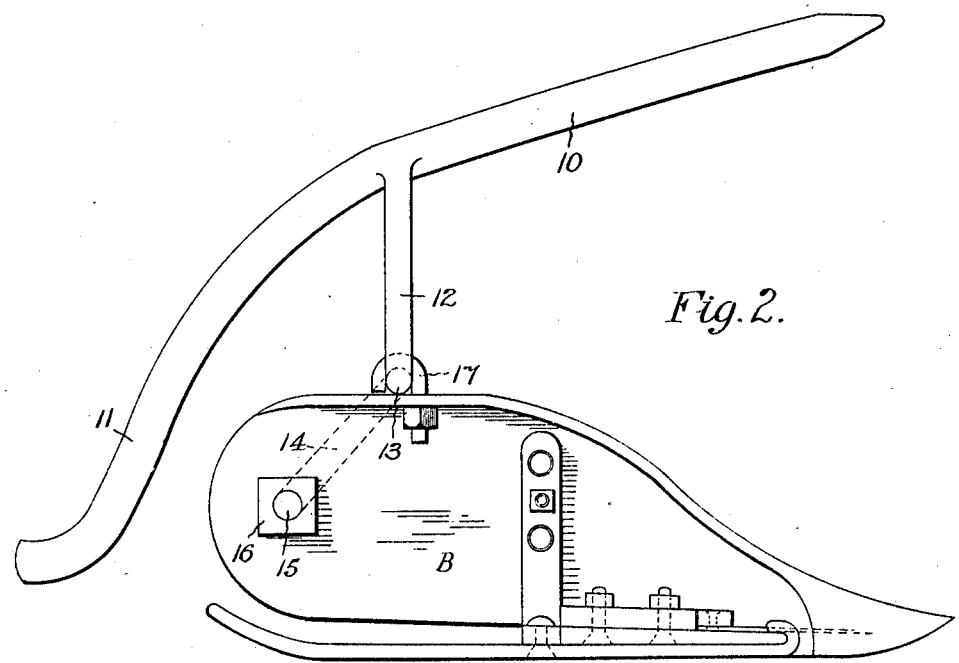
Witnesses
F. A. Barron.
A. R. Walton
Inventor
Alva Burton,
By Milo B. Stimmel
Attorneys

UNITED STATES PATENT OFFICE.

ALVA BURTON, OF COLUMBINE, COLORADO.

SWATH-ROD ATTACHMENT FOR MOWING-MACHINES.

980,195.  Specification of Letters Patent.  Patented Jan. 3, 1911.

Application filed February 21, 1910. Serial No. 545,084.

*To all whom it may concern:*

Be it known that I, ALVA BURTON, a citizen of the United States, residing at Columbine, in the county of Routt and State of Colorado, have invented certain new and useful Improvements in Swath-Rod Attachments for Mowing-Machines, of which the following is a specification.

My present invention relates generally to the class of mowing machines, and more particularly to an attachment therefor of that class generally known as "swath-rods," my object being to provide a swath-rod which will be of simple, cheap and light construction and entirely free from contact with the ground so as to obviate any side-pull upon the sickle bar, and which is adapted to be secured to the end shoe of the sickle bar in a novel and efficient manner.

With this in view, my invention resides in the features of construction and arrangement to be hereinafter described with reference to the accompanying drawing, in which, Figure 1 is a plan view of the outer end of a sickle bar showing my improved swath-rod attached thereto, and, Fig. 2 an end elevation thereof.

Referring to these figures, A represents a sickle and sickle-bar having the usual end shoe B provided with an upper flange b. My improved swath rod 10 extending rearwardly from a point perpendicularly above the forward end of shoe B, in its position for practical operation as shown, and at some distance thereabove, and inclines downwardly and rearwardly to a point slightly above the surface of the ground at its rear end, rearwardly of said shoe. This rod 10 has its rear end 11 curved inwardly toward the sickle-bar A, and has an intermediate depending vertical stem 12 provided with an intermediate transverse portion 13 which has an angular extension 14 terminating in a transverse threaded extremity 15 to receive a nut 16.

In practice, and as shown, the stem 12 upstands from the shoe B just rearwardly of sickle-bar A, its intermediate transverse portion 13 being secured upon said shoe by a hook-bolt 17 through the shoe flange b, and its angular portion 14 extending downwardly and rearwardly and having its extremity 15 locked through an opening in the shoe body, by its nut 16.

This swath rod thus receives the material against its upper forward end, the material sliding down thereon and off its lower inwardly curved rear end to the ground, and the swath being light and free from contact with the ground, there is no side pull upon the sickle bar.

I claim:

The combination with a sickle-bar of a mowing machine and its outer shoe, of a rearwardly and downwardly inclined swath-rod above said shoe, having an inwardly curved rear end and an intermediate depending stem, said stem having an intermediate transverse portion disposed upon said shoe and a lower rearwardly projecting angular portion terminating in a transverse threaded extremity extending through an opening in said shoe, a nut to engage said extremity and lock the same, and a hook-bolt locked through a portion of said shoe and engaging said intermediate stem portion to rigidly hold the same.

In testimony whereof I affix my signature in presence of two witnesses.

ALVA BURTON.

Witnesses:
SAMUEL CHANDLER,
JAS. R. CARON.